July 21, 1964   L. E. SODERQUIST   3,141,191
PRESS FOR SHAPING AND CURING PNEUMATIC TIRES
Filed March 28, 1961   6 Sheets-Sheet 1

INVENTOR.
LESLIE E. SODERQUIST
BY
ATTORNEYS

INVENTOR.
LESLIE E. SODERQUIST
BY
ATTORNEYS

July 21, 1964     L. E. SODERQUIST     3,141,191
PRESS FOR SHAPING AND CURING PNEUMATIC TIRES
Filed March 28, 1961     6 Sheets-Sheet 3

INVENTOR.
LESLIE E. SODERQUIST
BY
ATTORNEYS

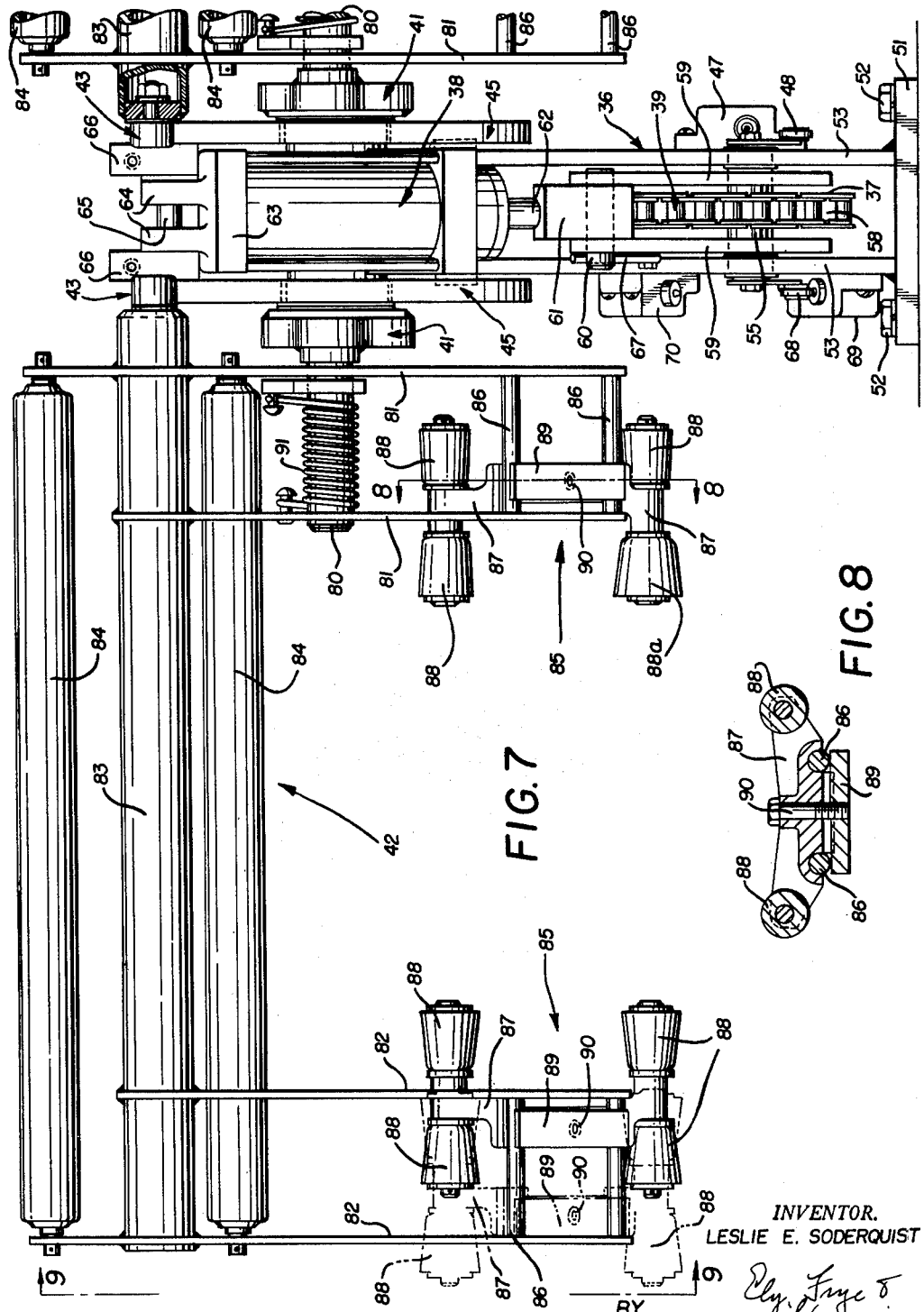

July 21, 1964  L. E. SODERQUIST  3,141,191
PRESS FOR SHAPING AND CURING PNEUMATIC TIRES
Filed March 28, 1961  6 Sheets-Sheet 5

INVENTOR.
LESLIE E. SODERQUIST
BY
ATTORNEYS

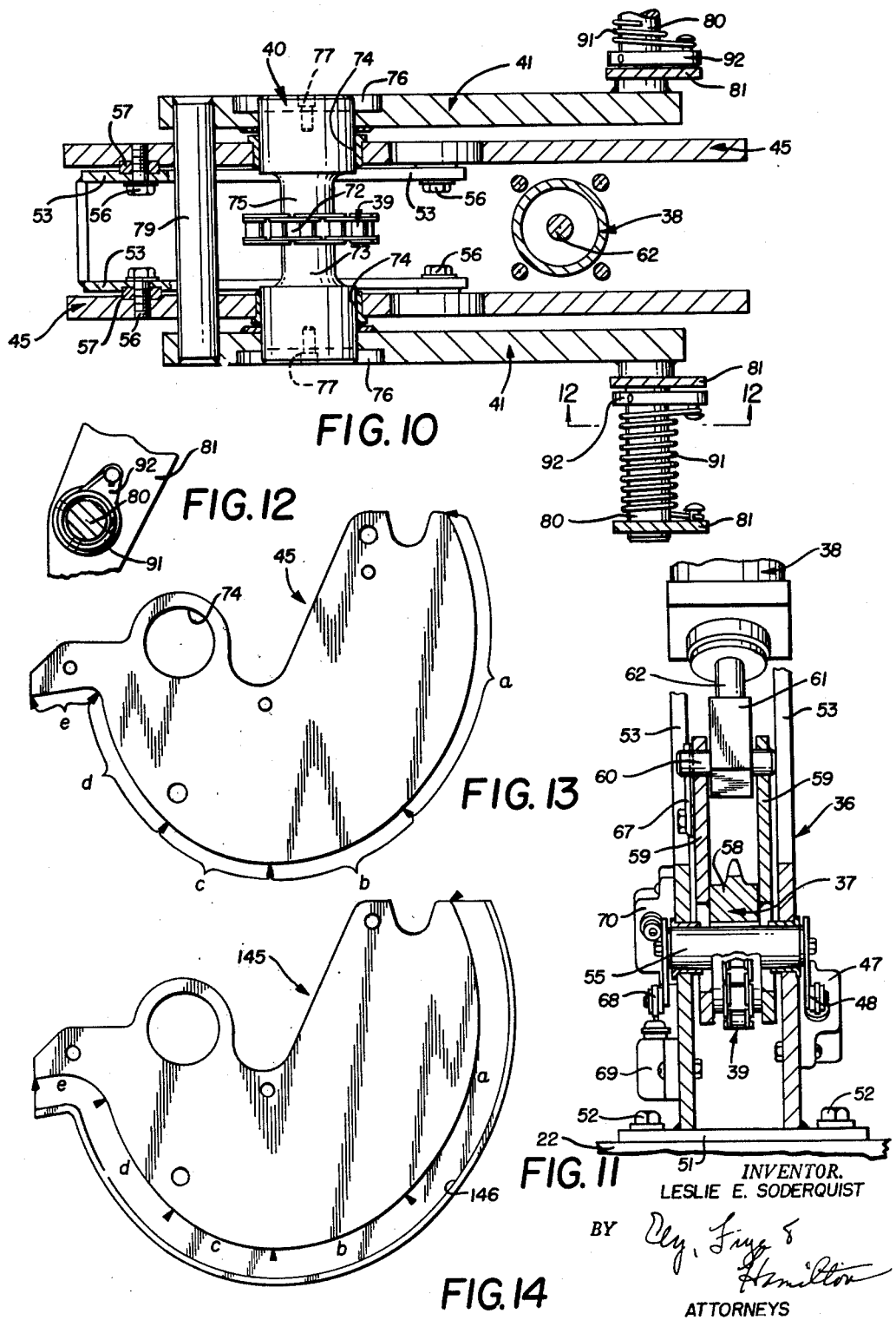

United States Patent Office 3,141,191
Patented July 21, 1964

3,141,191
PRESS FOR SHAPING AND CURING
PNEUMATIC TIRES
Leslie Edward Soderquist, Silver Lake, Ohio, assignor to
The McNeil Machine & Engineering Company, Akron,
Ohio, a corporation of Ohio
Filed Mar. 28, 1961, Ser. No. 98,854
8 Claims. (Cl. 18—2)

The present invention relates to improvements in tire presses for shaping and curing unvulcanized tire bands within separable mold sections. More particularly, the invention relates to improved mechanisms for automatically unloading cured tires from shaping and curing presses. Specifically, the invention relates to improvements particularly intended for use in the stripping of cured tires from around a permanent bag forming mechanism and discharge of the stripped tire from a press.

Heretofore, the most efficient and practical stripping and discharge mechanisms for permanent bag or diaphragm-type presses have included a pair of, or two, arms mounted on opposite sides, generally front and rear, of the forming mechanism. Power means located in the base of the press moved the arms to support the cured tire during the stripping operation. Then, to discharge the stripped tire it was necessary to preferentially raise one of the arms to tilt the tire so as to cause it to slide from the press by gravity.

Various mechanisms are known to this art for accomplishing the result of elevating one arm over the other to effect the desired angle or tilt for a stripped tire. However, in each practical mechanism known or used to date, separate operating or actuation linkages or mechanical elements have been required to complete the tilting movement of the one arm. Therefore, it is a principal object of the present invention to provide improved and simplified mechanical elements in mechanisms for automatically unloading cured tires from shaping and curing presses.

It is a related object to provide an unloading mechanism which will free or make available at the front of the press, space required or better utilized for installation of automatic loading mechanisms, or for servicing of the mold sections and forming mechanism. Further, it is an object to provide an unloading mechanism which is easier to service and maintain, and which utilizes a minimum of pneumatic or pressure fluid supply lines and control valving.

An important object of the present invention is to provide a compact and readily installed unloading mechanism which is adaptable for field installation and use with presses that heretofore had not been equipped for automatic unloading.

Still further, it is an object to provide an improved control cam for guiding movement of a cantileverly mounted conveyor for holding and discharging cured tires from a press.

These and other objects of the invention, as well as the advantages thereof, will be apparent in view of the following detailed description and the attached drawings.

Figure 3:
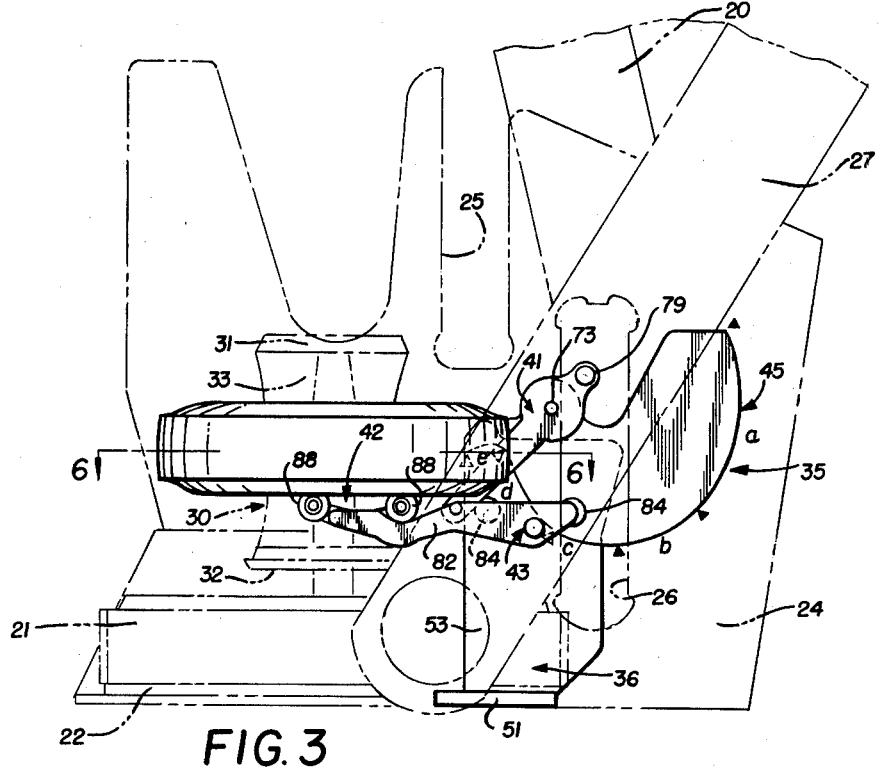
FIG. 3 is another side view, following sequentially after FIG. 2, showing the forming mechanism or diaphragm extracted from inside the cured tire and the unloading conveyor supporting the tire.
Figure 4:
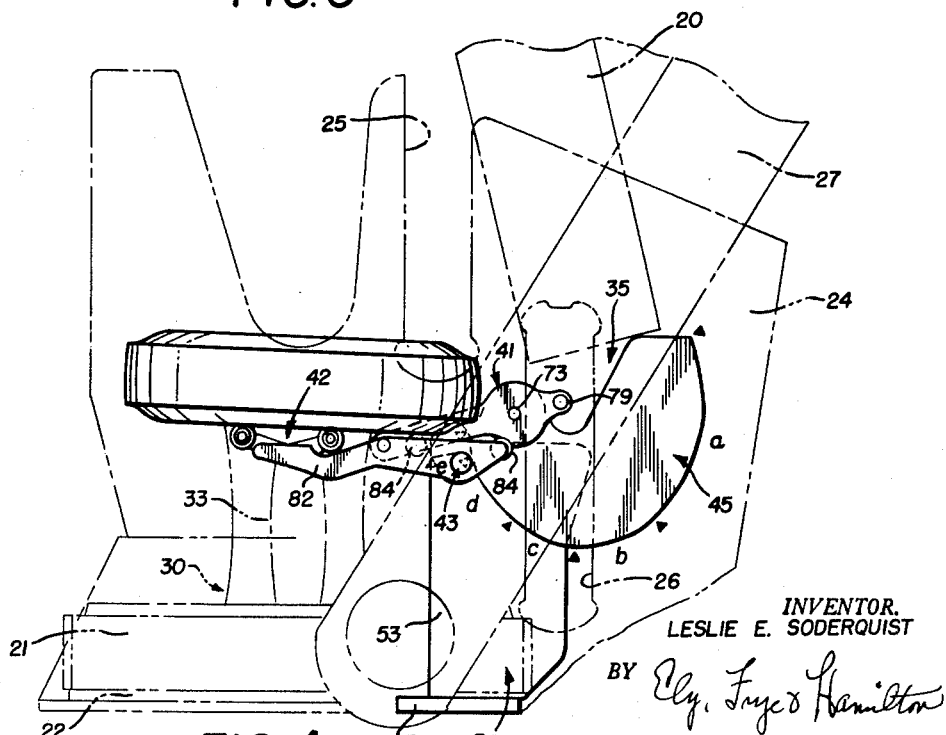
Figure 5:
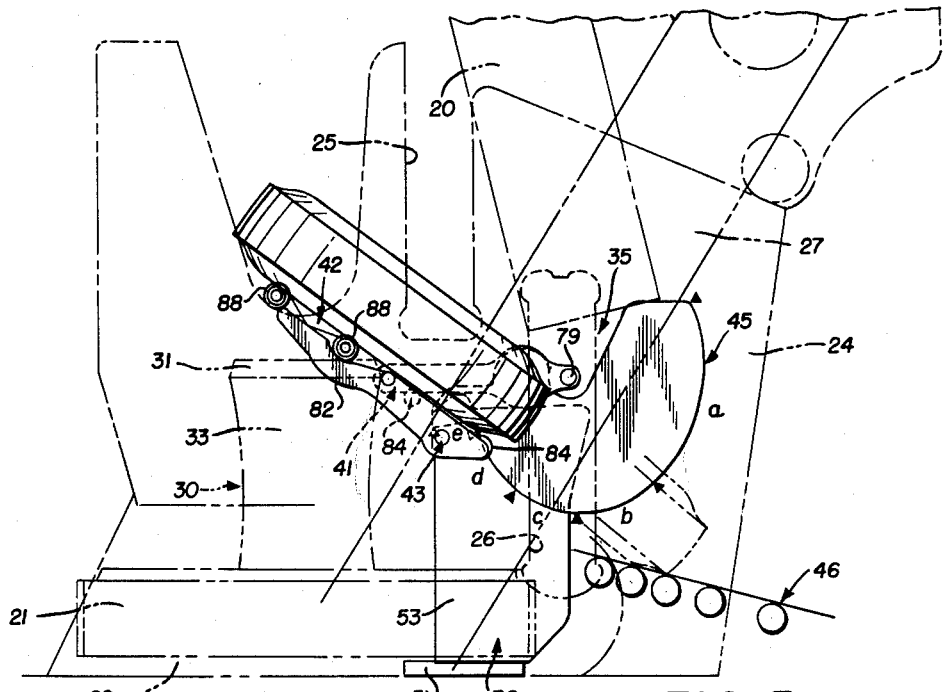
Figure 6:
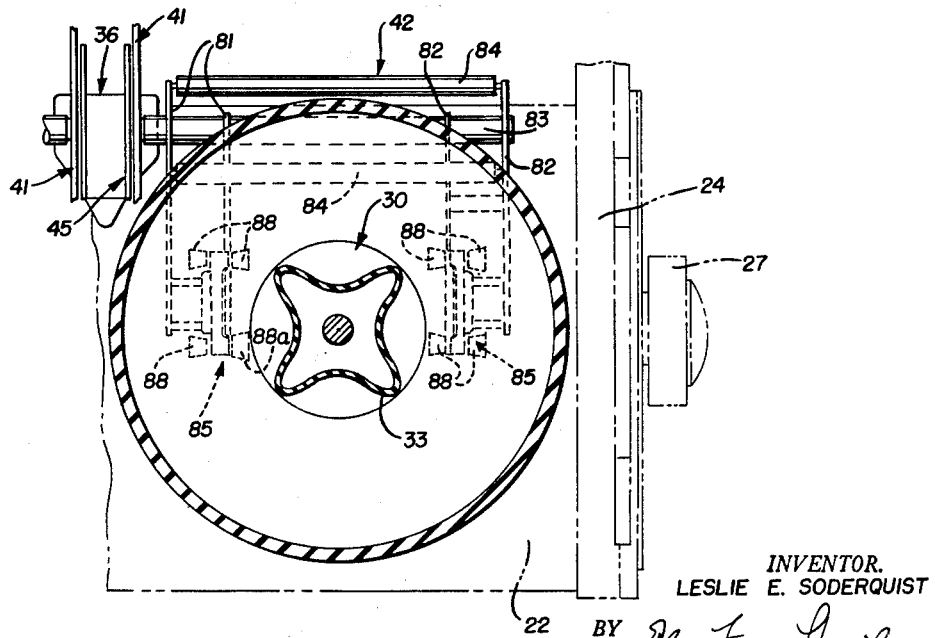

FIG. 4 sequentially follows FIG. 3 showing further advance of the unloading conveyor beginning to tilt the tire toward the rear of the press;

FIG. 5 sequentially follows FIG. 4 showing the unloading conveyor at the extreme position of forward and upward travel so that the cured tire discharges from the press onto a take-away conveyor;

FIG. 6 is a section, taken substantially on line 6—6 of FIG. 3, and showing show the beads of the cured tire may provide a positive restraint during extraction of the permanent bag or diaphragm from within a cured tire and positively provide for collapse of the bag into four or more folds or convolutions.

Figure 1:
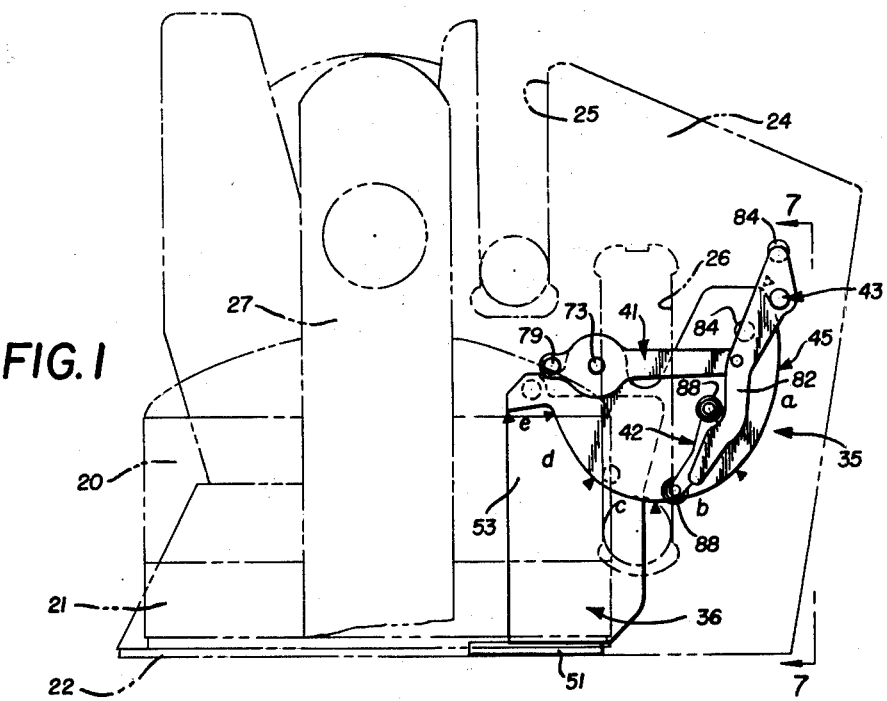
FIG. 1 is a schematic side elevation showing the improved unloading mechanism according to the invention in the retracted position with the press closed.
Figure 9:
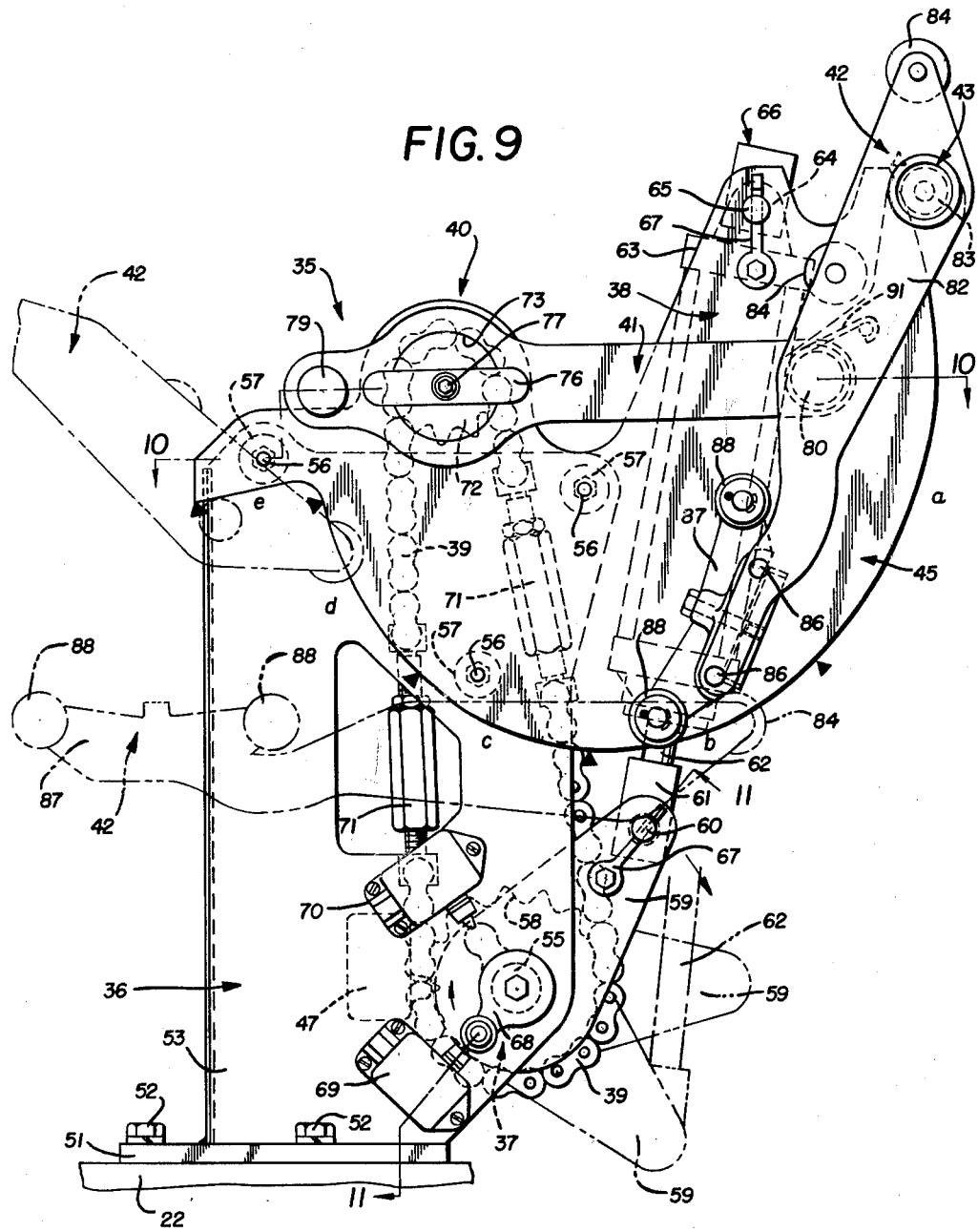

FIG. 7 is an enlarged fragmentary plan view, taken substantially as indicated on line 7—7 of FIG. 1;

FIG. 8 is a detail section, taken substantially as indicated on line 8—8 of FIG. 7;

FIG. 9 is a side elevation, taken substantially as indicated on line 9—9 of FIG. 7;

FIG. 10 is a plan section, taken substantially a s indicated on line 10—10 of FIG. 9;

FIG. 11 is an elevation section, taken substantially as indicated on line 11—11 of FIG. 9;

FIG. 12 is a detail section, taken substantially as indicated on line 12—12 of FIG. 10;

FIG. 13 is a view showing details of the specially contoured actuation surfaces of a control cam used in the unloading mechanism according to the invention; and FIG. 14 is a view showing a modified form of the control cam of FIG. 13.

General Description

A tire curing press suitable for practice of the invention has separable upper and lower mold sections, 20 and 21, and axially centered forming mechanisms or diaphragm-type shaping means.

Presses of this type are well known to this art as shown in a number of prior art patents of the inventor, including United States Patent No. 2,808,618 to which reference is made for such details of presses as are required to more fully understand the invention. These presses are constructed so that it is possible to obtain a maximum "tilt-back" of the upper mold section and clearance above the lower mold section without loss of valuable head room above the press. This type of press is preferred, but it will be apparent that presses of other types and designs could be used in the practice of the invention, for example, presses in which the upper mold section is not moved entirely out of the way and to one side of the press, so long as the cured tire is intended to be stripped or removed from a position of alignment with one or the other of the mold sections and discharged from the press.

The lower or stationary mold sections 21 are carried on a base 22. The movable upper mold sections 20 are supported from a crosshead. On opposite sides of the lower mold sections 21 are guide plates 24 extending upwardly from the base 22. At each end of the crosshead are suitable guiding arms having roller means engaged in parallel front and rear vertical guideways 25 and 26, respectively, in the guide plates 24. The crosshead is pivoted to the upper end of a pair of operating links 27 on opposite sides of the press and outside of the guide plates 24. The links 27 are actuated by large motor driven bull gears to raise the crosshead and open the press for unloading of a cured tire.

The forming mechanism 30 is preferably of the permanent bag or diaphragm type having separable upper and lower bead rings 31 and 32 clamping the ends of a shaping bag 33. The rings 31 and 32 are selectively moved by an appropriate and conventional axially located mechanism, not shown, to permit the bag 33 to be radially expanded during the shaping operation and to be first raised and then elongated or extended for bag extraction and stripping after the curing operation.

An unloading mechanism according to the invention, indicated generally by the numeral 35, is attached to a press solely by a center bracket or stanchion 36 mounted on the press base 22 adjacent and to the rear of a lower mold section 21. As shown, the mechanism 35 is installed to service a dual-type press with the stanchion 36 between two lower molds. The mechanism 35 has been conceived primarily for solution of certain complications peculiar to the unloading of dual presses, but in many aspects of the invention the improvement may be adapted to a single type press.

An unloading mechanism 35 further includes the following components, each being referred to generally by the numeral indicated. At the lower rear of stanchion 36 is a transversely extending lever and sprocket assembly 37. A downwardly directed cylinder or power means 38 is attached to the lever and selectively actuated to rotate the sprocket of assembly 37. A power transmission means 39 is trained upwardly around an aligned sprocket and drive shaft assembly 40 which is thereby directly connected to the assembly 37. The assembly 40 extends transversly of the stanchion and is suitably positioned above the lower assembly 37. As shown, the assembly 40 is journaled between cam plates 45 attached to the sides of stanchion 36. However, the assembly 40 could, if desired, be journaled between upward projections on the stanchion 36.

The outboard ends of the shaft of assembly 40 carry elongated rearwardly extending conveyor support and actuating arms 41. Each arm 41 pivotally carries at the rear end thereof a generally U-shaped conveyor 42 extending forwardly and adapted to fit around the forming mechanism 30 and support a cured tire. On the rear corner of each conveyor 42 is an inwardly extending cam follower means 43. The path followed by each follower means 43 is defined by the specially contoured actuation surfaces of a stationary cam or plate 45, attached to the sides of stanchion 36 inwardly of the conveyors 42 and extending transversely of the shaft of assembly 40.

Each cam plate 45 has a rearwardly and downwardly directed curvilinear surface which intersects a forwardly directed downwardly inclined linear surface. The curvilinear surface is asynarcuate, that is, the radius changes or comprises a multiplicity of different radii. The curvilinear surface preferably begins at the upper rear corner of each cam and extends through or in an arc of at least 180 degrees (°). The linear surface intersects the curvilinear surface at a rounded corner and is downwardly inclined at the required angle dependent on depth of the press, height of the shaping mechanism 30 when elongated, thickness of the cured tire, and other related factors. It is considered that a downward inclination for the linear surface of from four (4) to twenty (20) degrees (°) from horizontal will be satisfactory for installations according to the invention.

FIG. 13 depicts a preferred and easily manufactured form of cam plate 45, fabricated and machined, for example, from steel plate, in which the curvilinear surface of a cam is quadriarcuate, that is, has actuation surfaces with four different radii. For ease of understanding, the four successive actuation surfaces for this preferred form of a cam 45 have been delineated by the bracketed portions bearing the identifying letters $a$, $b$, $c$ and $d$.

The rearmost or first actuation surface $a$ guides forward movement of the conveyors 42 from the retracted position (FIG 1). This movement begins when the press is open and after the bead rings of the shaping mechanism 30 have been moved away from a mold section and should be accomplished quickly. Accordingly, the radius of surface $a$ is the longest (e.g. 13.5 inches) and is preferably swung from a center located above the axis of the shaft of assembly 40, so that passage of the follower means 43 along surface $a$ provides a rapid forward movement for the conveyors 42 with a minimum of piston movement of a power means cylinder 38.

The second actuation surface $b$ functions successively, and preferably without interruption, following passage of the follower means 43 along surface $a$ and terminates with the conveyors 42 in nearly a horizontal position between the cured tire and the mold section but not in contact with the cured tire. The radius of surface $b$ is shorter (e.g. 10.0 inches) than the radius of surface $a$ and is preferably swung from a center located below the axis of the shaft of assembly 40 so that passage of the follower means 43 along surface $b$ provides a slightly forward but more generally upward movement of the conveyors 42.

The third actuation surface $c$ also functions successively, and preferably without interruption, following passage of the follower means 43 along surfaces $a$ and $b$ and terminates with the conveyors 42 in a substantially horizontal position directly beneath the cured tire (FIG. 3). The radius of surface $c$ is even shorter (e.g. 8.0 inches) than the radius of surface $b$ and is preferably swung from a center below the axis of the shaft of the assembly 40 so that passage of the follower means 43 along surface $c$ provides a predominantly upward movement of the conveyors 42.

The fourth and last curvilinear actuation surface $d$ guides movement of the conveyors 42 upward from the tire support positions (FIGS. 2 and 3) to the beginning of the tilt position (FIG. 4). The radius of surface $d$ is substantially longer (e.g. 12.0 inches) than the radius of surface $c$ and is preferably swung from a center rearwardly of the axis of the shaft of the assembly 40 and the axes of surfaces $b$ and $c$.

The linear surface of a cam 45 is delineated by the bracket portion $e$. The intersection between surfaces $d$ and $e$ is rounded to facilitate passage of the follower means 43 and guide movement of the conveyors to the extreme position of forward and upward travel (FIG. 5) so that the cured tire will discharge from the press under the influence of gravity onto a take-away conveyor 46. To provide the desired discharge angle of not less than forty (40) degrees (°) the length of surface $e$ may be, for example, approximately four (4) inches and the downward inclination twelve (12) degrees (°).

In order to positively coordinate movement of the conveyors 42 with extraction of the shaping bag 33 from within a cured tire, it is preferred to employ an electrical control switch 47 to signal to the master controller of the press that the conveyors 42 are in position to support the curved tire. Control switch 47 may be actuated by a control striker 48 secured to the pivot pin of the lever and sprocket assembly 37.

Figure 2:
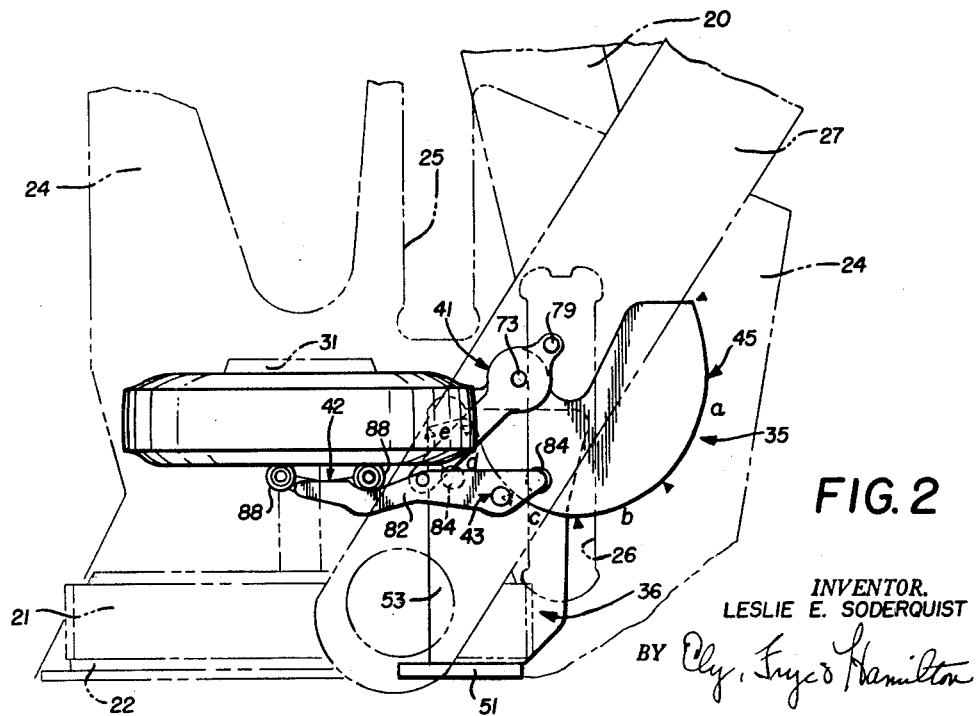
FIG. 2 is another side view showing the press open with the forming mechanism elevated above the lower mold section and the cured tire in position to be picked up and supported by the conveyor of the unloading mechanism.

Referring to FIGS. 3 and 6, when the conveyor arms 42 are in the desired position and switch 47 has been actuated, the diaphragm or bag 33 may then be extracted. The bag extraction may result from a separation movement of the rings 31 and 32 which, after opening of the press and before forward movement of the conveyor arms 42, had been lifted together to a position with the cured tire above and out of contact with the mold (FIG. 2). For further explanation of this technique of bag extraction, reference is made to the inventor's prior United States Patent No. 2,495,663, particularly FIGS. 7 and 8. Operational advantages achieved by this particular technique of bag extraction include utilizing the beads of the cured tire itself to positively provide for the collapse of the bag 33 into four or more folds with a small diameter, such as to avoid or minimize abrasion or frictional contact with the outer surfaces of the bag, during loading of an uncured tire or unloading of a cured tire as described herein, which contributes to longer bag life. Also, the tire beads are uniformly detached from the rings 31 and 32 and upon discharge, the stripped tire has to pass upward along less than half the height of the bag 33, which tends to protect both the tire and the bladder.

However, operation of the mechanism 35 is compatible with other techniques of diaphragm extraction, for example, the technique disclosed in another United States patent of the inventor, No. 2,495,664 in which extraction of the bag 33 is accomplished primarily by upward movement of an upper ring 31 with the conveyor arms 42 serving to gradually lift the cured tire, during the time the bag is being removed, to the final elevated position (FIG. 5). Using either technique, the elongated shaping mechanism as a whole is permitted to drop back toward the lower mold section 21 to facilitate final discharge of the cured tire and the loading of a "green" or uncured tire.

Detailed Description

The bracket or stanchion 36 has a base plate 51 suitably drilled for attachment to the press base 22 as by bolts 52. Extending upwardly from the base plate are spaced apart, preferably identical side plates 53. Each plate 53 has a suitable bore adjacent the lower rear side thereof to rotatably mount the pivot pin 55 of the lever and sprocket assembly 37. Each cam plate 45 may be mounted on and parallel to a side plate 53 as by bolts 56. As best shown in FIG. 10, to insure full face contact of the cam follower means 43 with the cam actuation surfaces it is preferred that the cam plates 45 be spaced a slight distance away from the side plates 53, as by use of counterbores and spacers 57 around each bolt 56.

The lever and sprocket assembly 37 includes a toothed sprocket 58 securely mounted on the pivot pin 55. On either side of sprocket 58 are securely attached lever arms 59. The outer end of the lever arms carry a pin 60 for rotatably mounting a block 61 attached to the piston rod 62 of the cylinder or power means 38. The cylinder 38 is a conventional double-acting cylinder, of suitable power output and pressure fluid actuation. The upper end of cylinder 38 has a head 63. The cylinder head has a suitable clevis 64 engaging a mounting pin 65 extending across the rear upper end of each cam plate 45. If desired, manifolds 66 may be fastened to the pin 65 for connection of fluid pressure piping to the cylinder 38. Also, if desired, safety pins 67 may secure the ends of pins 60 and 65.

Reference has been made to the control switch 47, attached to one side plate 53, and striker 48 attached to one end of pivot pin 55. It is preferred to similarly attach to the other end of pivot pin 55, another control striker 68, to selectively actuate a lower electrical control switch 69 and an upper electrical control switch 70 mounted on the other side plate 53. Control switch 69 is actuated to signal the master controller of the press when the conveyor arms 42 are in the retracted position (FIG. 1). Control switch 70 is actuated to signal the master controller when the conveyor arms are in the extreme unloading position.

The power transmission means 39 may be a heavy duty chain having links of suitable pitch (e.g. one (1) inch) and connected by two turnbuckles 71 for tightening and relative adjustment to the power means 38. The chain 39 is trained upward from around sprocket 58 over a sprocket 72 of sprocket and shaft assembly 40. It is preferred that the relative diameters of the sprockets 58 and 72 provide approximately a two-to-one reduction to achieve maximum power output from the power cylinder 38.

The short strong cross shaft 73 of assembly 40 has large diameter outboard end portions preferably journaled in suitable bores 74 on the upper side of each cam plate 45. Between the ends, shaft 73 has a medial portion 75 carrying the sprocket 72. The outer face of each shaft end has a suitable transverse slot for mounting of a heavy duty key 76 attached to the shaft as by a bolt 77.

A conveyor support and actuating arm 41 is securely attached to each end of shaft 73 by a key 76. The forward ends of the cross arm 41 are connected by a stabilizing rod 79, which also preferably contacts the forward upper surface of the cam plate 45 to positively stop the arms 41 when the conveyors 42 are in the retracted position (FIG. 1). The rearward end of each arm 41 carries an outwardly extending stub shaft 80 for cantilevered and pivotal mounting of a conveyor 42.

Each conveyor 42 has a generally U shaped frame with forwardly directed or projecting leg portions adapted to fit around the forming mechanism 30. Each conveyor leg portion is preferably defined by a pair of frame plates. The inner pair of frame plates 81 are suitably bored to receive the stub shaft 80 of each conveyor arm. The outer pair of frame plates 82 are tied together as a structural unit with frame plates 81 by a cross member 83. On either side of member 83 are suitable conveyor rolls 84 extending the width of the conveyor.

Each projecting leg portion of a conveyor 42 carries suitable tire engaging means 85 for supporting and lifting a cured tire. Each pair of frame plates, 81 and 82, are connected by a pair of small diameter cross rods 86. As best shown in FIG. 8, the cross rods 86 support a wing shaped bracket 87 carrying adjacent each corner preferably tapered rollers 88 for contact with the under side of a cured tire. Each bracket 87 is secured to a pair of rods 86 by a tie plate 89 and a fastening bolt 90. The operative position of each bracket 87 is adjustable to readily adapt the mechanism 35 for the unloading of various sized tires.

Referring to FIG. 7, it will be noted that roller 88a, mounted on the inner front corner of the inboard roller bracket 86, has a larger diameter than the other seven rollers 88 shown. It has been found that by enlarging the diameter of roller 88a, in the area of contact with the lower bead of a cured tire, the effective or resultant force available to break the cured tire loose from the ring 32, during bag extraction will be increased.

The cam follower means 43, which contacts the actuation surface of the cam plate 45, is carried on the inner end of each conveyor member 83. To maintain the follower means 43 in continuous contact with the cam actuation surface, a coiled torsion spring 91 may be fitted coaxially over the stub shaft 80 of a conveyor arm. One end of spring 91 is secured to a bracket 92 on the shaft 80 and the other end is secured to a frame plate 81 (see FIG. 12). Viewed as in FIG. 9, the spring 91 is so constructed as to bias the conveyor 42 and follower means 43 in a counterclockwise direction.

Referring to FIG. 14, in an alternative form, a cam plate 145 may be precision cast as a foundry product. If this form is used, it is possible to integrally cast an integral raceway 146 for both guiding the follower means 43 in the desired actuation path and positively maintaining the follower means in contact with the cam actuation surfaces.

Referring again to FIGS. 1–5, an illustrative sequence of the operation of the unloading mechanism 35 is as follows:

In FIG. 1, the separable press mold sections 20 and 21 are closed, the conveyors 42 are in the substantially vertical retracted position, and the cam follower means 43 are engaging the upper portion of surface 45a of the stationary cam plate 45;

In FIG. 2, the press has opened, the cured tire has been stripped and elevated above the lower mold section 21 by the forming mechanism 30, and the conveyors 42 have been moved forwardly below and beneath the cured tire by energization of the power means of the unloading mechanism 35, the cam follower means 43 having traversed along the entire length of surfaces 45a, 45b and 45c of the cam plate 45;

In FIG. 3, the condition of the unloading mechanism 35 has not changed substantially from FIG. 2, the conveyors 42 remaining stationary contacting the under side of and supporting the cured tire while the forming mechanism 30 is actuated to elongate or extend the shaping bag 33 from within the cured tire;

In FIG. 4, the elongated shaping bag 33 has been lowered so that the lower bead ring of the forming mechanism 30 is seated in the lower mold section, and the conveyors 42 have been moved further forwardly and upwardly by further energization of the power means of the unloading mechanism 35, the cam follower means 43 having traversed cam surface 45d to the beginning of the tilt position at the intersection of surfaces 45d and 45e.

In FIG. 5, the conveyors 42 are at the extreme position of forward and upward travel, the cam follower means having moved forwardly and downwardly along cam surface 45e, to provide a discharge angle such that the cured tire will roll down and onto the take-away conveyor 46.

A production model of an improved unloader mechanism 35, embodying the concepts of the invention, has been shown and described. Where considered helpful in understanding the concepts of the invention, certain mathematical values have been included by way of specific example. However, the invention need not be limited to the exact forms as described so long as the proportions and relative configurations are maintained. Therefore, the true scope of the invention should be determined by the scope of the following claims.

What is claimed is:

1. Apparatus for removing cured tires from a press for shaping and curing tires, said press having a lower mold section and a tire forming mechanism adapted to elevate the cured tire above the lower mold section, said apparatus being mounted on said press and movable under control of a cam means into contact with the under side of a cured tire and then to an inclined position to tilt the tire for discharge from said press, said apparatus comprising, a stanchion attached to the base of said press adjacent a lower mold section, a drive shaft extending transversely of said stanchion and having an outboard end, power means on said stanchion to rotate said shaft, an arm attached to an outboard end of said shaft, a U shaped conveyor pivotally carried by said arm, cam follower means on said conveyor, and a cam plate between said stanchion and said conveyor, said cam plate having a downwardly directed asynarcuate curvilinear surface intersecting a downwardly inclined linear surface, said cam surfaces being engaged by said follower means during rotation of said shaft.

2. Apparatus for removing cured tires from a press for shaping and curing tires, said press having a lower mold section and a tire forming mechanism adapted to elevate the cured tire above the lower mold section, said apparatus being mounted on said press and movable under control of a cam means into contact with the under side of a cured tire and then to an inclined position to tilt the tire for discharge from said press, said apparatus comprising, a stanchion attached to the base of said press adjacent and to the rear of a lower mold section, a drive shaft extending transversely of said stanchion and having an outboard end, power means on said stanchion to rotate said shaft, an arm attached to an outboard end of said shaft, a forwardly directed U-shaped conveyor pivotally carried by said arm, cam follower means on said conveyor, and a cam plate between said stanchion and said conveyor, said cam plate having a rearwardly and downwardly directed asynarcuate curvilinear surface intersecting a forwardly directed downwardly inclined linear surface, said cam surfaces being engaged by said follower means during rotation of said shaft.

3. Apparatus for removing cured tires from a press for shaping and curing tires, said press having a lower mold section and a tire forming mechanism adapted to elevate the cured tire above the lower mold section, said apparatus being mounted on said press and movable under control of a cam means into contact with the under side of a cured tire and then to an inclined position to tilt the tire for discharge from said press, said apparatus comprising, a stanchion attached to the base of said press adjacent and to the rear of a lower mold section, a drive shaft extending transversely of said stanchion and having an outboard end, power means on said stanchion to rotate said shaft, an arm attached to an outboard end of said shaft, a forwardly directed, U-shaped conveyor pivotally carried by said arm, cam follower means on said conveyor, and a cam plate between said stanchion and said conveyor, said cam plate having a rearwardly and downwardly directed quadriarcuate curvilinear surface intersecting a forwardly directed linear surface inclined downwardly at from 4° to 20° from horizontal, said cam surfaces being engaged by said follower means during rotation of said shaft.

4. Apparatus for removing cured tires from a press for shaping and curing tires, said press having a lower mold section and a tire forming mechanism adapted to elevate the cured tire above the lower mold section, said apparatus being mounted on said press and movable under control of a cam means into contact with the under side of a cured tire and then to an inclined position to tilt the tire for discharge from said press, said apparatus comprising, a vertical stanchion attached to the base of said press adjacent and to the rear of a lower mold section, a lever and sprocket assembly extending transversely of said stanchion, power means to actuate said lever and rotate said sprocket, a sprocket and drive shaft assembly extending transversely of said stanchion above said lever, said shaft having an outboard end, power transmission means connecting said sprockets, a rearwardly extending conveyor arm attached to an outboard end of said shaft, a conveyor adapted to fit around said forming mechanism pivotally carried by said arm adjacent the rear thereof, cam follower means extending toward said stanchion from the rear of said conveyor, and a cam plate between said stanchion and said conveyor, said cam plate having a downwardly directed asynarcuate curvilinear surface intersecting a downwardly inclined linear surface, said cam surfaces being successively engaged by said follower means during rotation of said sprockets.

5. Apparatus for removing cured tires from a press for shaping and curing tires, said press having a lower mold section and a tire forming mechanism adapted to elevate the cured tire above the lower mold section, said apparatus being mounted on said press and movable under control of a cam means into contact with the under side of a cured tire and then to an inclined position to tilt the tire for discharge from said press, said apparatus comprising, a vertical stanchion attached to the base of said press adjacent and to the rear of a lower mold section, a lever and sprocket assembly extending transversely of said stanchion, power means to actuate said lever and rotate said sprocket, a sprocket and drive shaft assembly extending transversely of said stanchion above said lever, said shaft having an outboard end, power transmission means connecting said sprockets, a rearwardly extending conveyor arm attached to an outboard end of said shaft, a conveyor adapted to fit around said forming mechanism pivotally carried by said arm adjacent the rear thereof, cam follower means extending toward said stanchion from the rear of said conveyor, and a cam plate between said stanchion and said conveyor, said cam plate having a rearwardly and downwardly directed quadriarcuate curvilinear surface intersecting a forwardly directed linear surface, said cam surfaces being successively engaged by said follower means during rotation of said sprockets.

6. Apparatus according to claim 5 in which said cam plate curvilinear surface begins at the upper rear edge of said cam plate and extends in an arc of at least 180° before intersecting said forwardly directed linear surface.

7. Apparatus according to claim 6 in which said linear surface is downwardly inclined at an angle of from 4° to 20° from horizontal.

8. Apparatus according to claim 6 in which said linear surface is downwardly inclined at an angle of approximately 12° from horizontal.

References Cited in the file of this patent

UNITED STATES PATENTS

| | | |
|---|---|---|
| 2,710,103 | Castello | June 7, 1955 |
| 2,802,586 | Wingard | Aug. 13, 1957 |
| 2,832,991 | Soderquist | May 6, 1958 |
| 2,832,992 | Soderquist | May 6, 1958 |
| 2,911,670 | Soderquist | Nov. 10, 1959 |
| 2,978,741 | Soderquist | Apr. 11, 1961 |

UNITED STATES PATENT OFFICE
CERTIFICATE OF CORRECTION

Patent No. 3,141,191                          July 21, 1964

Leslie Edward Soderquist

It is hereby certified that error appears in the above numbered patent requiring correction and that the said Letters Patent should read as corrected below.

Column 2, line 11, for "show" read -- how --; line 22, for "a s" read -- as --; column 3, line 15, for "improvement" read -- improvements --; column 4, line 32, for "and" read -- or --.

Signed and sealed this 17th day of November 1964.

(SEAL)
Attest:

ERNEST W. SWIDER                                  EDWARD J. BRENNER
Attesting Officer                                        Commissioner of Patents